(12) United States Patent
Usbeck et al.

(10) Patent No.: US 7,246,034 B2
(45) Date of Patent: Jul. 17, 2007

(54) SURVEYING APPARATUS AND METHOD OF ANALYZING MEASURING DATA

(75) Inventors: Christian Usbeck, Benshausen (DE); Peter Brueckner, Suhl (DE); Olaf Kuehn, Suhl (DE); Gerhard Linss, Suhl (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 11/078,637

(22) Filed: Mar. 11, 2005

(65) Prior Publication Data

US 2005/0228614 A1    Oct. 13, 2005

Related U.S. Application Data

(63) Continuation-in-part of application No. PCT/EP03/09996, filed on Sep. 9, 2003.

(30) Foreign Application Priority Data

Sep. 14, 2002  (DE) .............................. 102 42 852

(51) Int. Cl.
*G06F 15/00*     (2006.01)
(52) U.S. Cl. ...................... 702/179; 702/182
(58) Field of Classification Search ................. 702/36, 702/150, 158, 193, 189, 182, 179; 382/181, 382/199, 203, 291; 348/47, 49, 50; 381/181, 381/199, 291
See application file for complete search history.

(56) References Cited

U.S. PATENT DOCUMENTS

| | | | |
|---|---|---|---|
| 3,069,654 A | | 12/1962 | Hough et al. |
| 5,616,905 A | * | 4/1997 | Sugiyama ................... 235/456 |
| 5,991,437 A | * | 11/1999 | Migdal et al. ............... 382/154 |
| 6,747,576 B2 | | 6/2004 | Schaefer |
| 2004/0264761 A1 | * | 12/2004 | Mas et al. ................... 382/154 |

FOREIGN PATENT DOCUMENTS

| | | |
|---|---|---|
| DE | 19600002 | 7/1996 |
| DE | 19735975 | 3/1999 |
| DE | 19900737 | 7/2000 |
| DE | 10055572 | 1/2002 |
| EP | 0669593 | 8/1995 |

OTHER PUBLICATIONS

V.L. Brailovsky "An Approach to form recognition based on non-linear projections, search and optimization", Pattern Recognition Letters 18 (1997), pp. 1099-1107.
P. Haberäcker "Praxis der digitalen Bildverarbeitung und Mustererkennung", Carl Hanser Verlag, München Wien, (1995) chapter 12, pp. 295-308.
English language abstract of German Patent Publication No. DE 19600002, published Jul. 11, 1996, esp@cenet database.
English language abstract of German Patent Publication No. DE 19735975, published Mar. 4, 1999, esp@cenet database.
English language abstract of German Patent Publication No. DE 19900737, published Jul. 27, 2000, esp@cenet database.

* cited by examiner

*Primary Examiner*—Bryan Bui
(74) *Attorney, Agent, or Firm*—Cooper & Dunham LLP

(57) ABSTRACT

Embodiments of the invention relate to a method for minimizing the influence of disturbing signals during calculation of shape elements from coordinate points. An aim of the embodiments of the invention is to exclude the coordinates which are not to be locally assigned to the desired shaped element from the calculation of the shaped element. This aim is achieved by combining compensation methods for calculating the desired type of shaped element with recognition methods for the same type of shaped element and using the recognition methods for filtering the coordinate points that are relevant for calculating the shaped element out of all input coordinate points.

26 Claims, 6 Drawing Sheets

SURVEYING APPARATUS AND METHOD OF ANALYZING MEASURING DATA

CROSS REFERENCE TO RELATED APPLICATIONS

This application is a continuation-in-part of International Application No. PCT/EP2003/009996, with an international filing date of Sep. 9, 2003, which International Application was published by the International Bureau on Apr. 1, 2004, and which was not published in English, the entire contents of which are incorporated herein by reference. This application also claims the benefit of DE 102 42 852.2 filed on Sep. 14, 2002, the entire contents of which are incorporated herein by reference.

BACKGROUND OF THE INVENTION

1. Field of the Invention

The present invention relates to surveying instruments and methods of analyzing measuring data.

2. Brief Description of Related Art

A conventional surveying apparatus, such as a totalstation, a tacheometer, and a theodolite, comprise an optical system, such as a telescope, having a predetermined optical axis carried on a mounting structure such as a tripod. A user, while looking through the telescope, adjusts an orientation of the telescope relative to the tripod such that a target of interest coincides with the optical axis of the telescope. The target of interest may comprise a reflector or pole or other features of an object such as an edge of a building or a landmark or others. By measuring the angle of the telescope relative to the mounting structure, it is possible to determine a position of the target. For this purpose, the surveying apparatus may comprise angle sensors, an optical distance measuring system and a light projection system transmitting a light beam through the telescope to a reflector located at the target.

Recently, research has been performed to develop a surveying apparatus comprising a camera for detecting an image of a scenario including the target, wherein an image processing is performed to automatically identify the target within the image and to determine the position of the target within the image.

It has been found that the conventional methods of image processing may not always achieve a satisfactory measuring result. The images detected by the camera are subject to disturbances due to varying lighting conditions. Moreover, the object to be identified in the image may have complex structures due to textured surfaces and image backgrounds, and portions of the objects to be identified may be hidden by other objects, such as trees. Therefore, a reliable and robust detection of object features is not always possible.

SUMMARY OF THE INVENTION

The present invention has been accomplished taking the above problems into consideration.

Embodiments of the present invention provide a surveying apparatus allowing improved detection of features of an object in an image recorded by a camera.

Embodiments of the present invention provide a method of analyzing measuring data representing features of an object.

Embodiments of the present invention provide a method of analyzing measuring data comprising: inputting measuring data from a measuring device the measuring data comprising a set of data values representing features of an object; performing a recognition method on at least a subset of the data values for determining first parameters of a geometric shape element representing at least a portion of a feature of the object; eliminating outliers from the set of data values, the outliers having a distance from the shape element having the determined first parameters greater than a first threshold; and performing a first regression analysis on a set of remaining data values not including the outliers, for determining second parameters of the geometric shape element such that the shape element having the second parameters is a better representation of the portion of the at least one feature of the object than the shape element having the first parameters.

The inventors have found that measuring data including disturbances are not always well-suited to be processed by a regression analysis for determining parameters of a geometric shape element such that the shape element best approximates the feature of the object. In particular, outliers included in the measuring data tend to deteriorate the result of the regression analysis.

According to embodiments of the present invention, a recognition method is applied to the measuring data for identifying a geometric shape element represented by the disturbed measuring data. Thereafter, outliers of the measuring data and representing disturbances of the measuring data are eliminated, and the first regression analysis is performed on the remaining measuring data not including the outliers. A result of the regression analysis is a set of parameters of the geometric shape element coinciding with the desired feature of the object to a high accuracy. It has been found that the recognition method applied to the disturbed measuring data is well-suited for identifying the outliers such that the remaining measuring data not including the outliers form an improved basis for determining the parameters of the shape element by regression analysis.

According to an exemplary embodiment of the invention, the recognition method comprises determining the first parameters of the geometric shape element such that a number of data values coinciding with the geometric shape element having the first parameters has a maximum value. Such recognition method has been found to be very robust even if a significant amount of outliers is included in the measuring data, and the outliers may be easily identified and eliminated thereafter.

According to an exemplary embodiment, the recognition method comprises performing a Hough transformation based on the disturbed measuring data. Background information relating to the Hough transformation is disclosed in U.S. Pat. No. 3,069,654 and in "Praxis der digitalen Bildverarbeitung und Mustererkennung" by P. Haberäcker, Munich, Hanser, 1995, pages 294 to 308. The entire contents of these documents are incorporated herein by reference.

According to an exemplary embodiment of the invention, the elimination of the outliers from the set of data values is based on an analysis of a distance of the data values from the shape element having the first parameters determined in the recognition method. Data values having a distance from the shape element which is greater than a first threshold are identified as outliers. According to an embodiment herein, the distance is calculated as the Euclidian distance of the respective data value from the shape element having the first parameters determined in the recognition method.

The first threshold may be a predetermined threshold or a threshold determined in dependence of an analysis of a distribution of values of the distances of the data values from the shape element having the determined first parameters.

The geometric shape element may comprise a straight-line, a circle, an ellipse, a cylinder or other suitable shapes.

According to an exemplary embodiment, the shape element is a straight-line, and the first parameters may comprise a slope and an offset of the straight-line or any other suitable representation of the straight-line.

According to an exemplary embodiment of the invention, the recognition method is preceded by a second regression analysis for determining parameters of the geometric shape element. Thereafter, a quality of an approximation of the feature of the object by the geometric shape element having the parameters determined in the second regression analysis is determined and the recognition method is only performed if a value representing the quality of the representation indicates that the quality is insufficient. With such method it is possible to avoid the recognition method requiring extensive calculations in situations where disturbances of the measuring data are relatively low.

According to an exemplary embodiment herein, the determination of the quality of the representation of the feature of the object by the geometric shape element having the parameters determined in the second regression analysis is based on distances of the data values from the corresponding shape element. Again, the distances may be Euclidean distances of the data values from the shape element.

The quality of the representation may be found to be sufficient if a value representing the quality does not exceed a suitable second threshold. The second threshold may be a predetermined threshold or a threshold determined according to an analysis of a distribution of values of the distances of the data values from the shape element having the third parameters determined in the second regression analysis.

According to a further aspect of the present invention, there is provided a surveying apparatus comprising a camera and a controller for receiving image data from the camera. The controller is configured to generate measuring data to be analyzed from the image data, and to perform the above illustrated method of analyzing the generated measuring data.

It has been found that the above illustrated method is a robust method for identifying geometric shape elements representing a feature of an object imaged by the camera also in situations where significant disturbances are included in the image data.

For example, the surveying apparatus may be used to measure a position of an edge of a building imaged by the camera. Portions of the edge of the building may be hidden by obstacles, such as a tree. A suitable shape element for approximating the edge of the building is a straight-line. The method implemented in the controller determines parameters of the straight-line such that the straight-line coincides with the representation of the edge of the building in the detected image. Such determination of the parameters of the straight-line is robust and largely not affected by the obstacles hiding portions of the edge of the building in the image or by other disturbances.

According to an exemplary embodiment of the invention, the surveying apparatus further comprises an input device for receiving a user selection of a type of the geometric shape element. The geometric shape elements may comprise elements such as a straight-line, a circle, an ellipse and a cylinder.

According to a further exemplary embodiment, the surveying apparatus further comprises a display for displaying an image represented by the image data. The apparatus may further comprise an input device for selecting a portion of the displayed image. The controller is then further configured to generate the measuring data subject to the analysis according to the above illustrated method from the image data representing the selected portion of the displayed image. A user may perform a short analysis of the displayed image and determine a portion of the image containing the target of interest of the surveying task, such as an edge of a building. By selecting the portion containing the target, it is possible to reduce an amount of data to be processed by the analyzing method.

According to an exemplary embodiment of the present invention, the surveying apparatus comprises an output device for receiving the determined parameters of the shape element. The output device may comprise the display or a memory, such as a magnetic memory or a solid-state memory which may be included in the controller.

A computer-readable carrier containing information representing a computer program adapted to cause a processing unit of a controller to execute the methods described herein is further provided. The computer-readable carrier can be any suitable type of carrier such as a solid-state memory, a magnetic memory, optical memory, other type of memory, or modulated waves/signals (e.g. radio frequency, audio frequency, or optical frequency modulated waves/signals) suitable for being transmitted through any suitable network, such as the internet.

A computer system comprising a processor and a program storage device readable by the computer system, tangibly embodying a program of instructions executable by the processor to perform the methods described herein is further provided. The computer system may be separate from the surveying apparatus illustrated above. For example, a surveying apparatus may record image data from a camera on a storage device, such as a solid-state memory, a hard disc or other suitable storage devices, and the image data may be transferred to the computer system for further analysis according to the methods described herein. For example, it is possible to transfer the image data from the surveying apparatus to the computer system through a suitable network, such as a wireless network or the internet.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
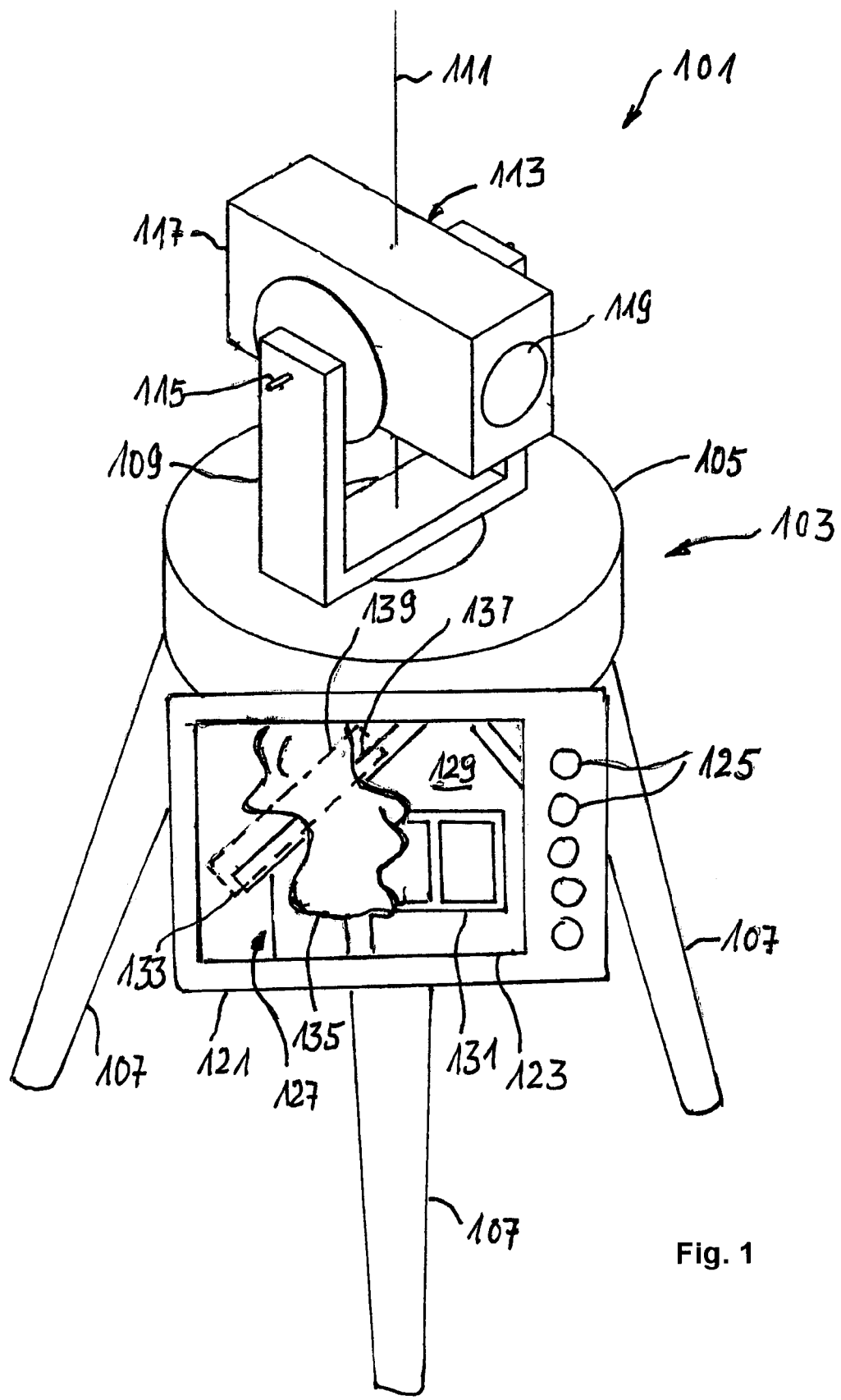
FIG. 1 is a schematic illustration of a surveying apparatus according to an embodiment of the invention and having the method according to an embodiment of the invention implemented therein.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

The invention includes methods of filtering coordinate points in the calculation of shape elements with the aim to exclude such coordinates from the shape element calculation which can locally not be assigned to the expected ideal geometric shape.

The calculation of the shape of the object of measurement from a set of measuring data, such as coordinate points of the object surface that have been acquired by probing, is a well-known problem in coordinate measurement. The shape is described by ideal geometric substitute elements (briefly called shape elements), such as straight line, circle, ellipse, sphere, or cylinder. The acquired coordinate points are partly in random order and, due to disturbing influences, deviate from the real geometry of the object. In particular in situations where coordinate points are optically acquired by means of image sensors, such as a camera, the deviations from the real shape may be substantial. This may be caused, for example, by instable lighting conditions, dust deposits on the object edges, or textured surfaces and image backgrounds. If the unfiltered coordinate points are used in a regression analysis for determining a shape element, the measurement results may considerably deviate from the real geometry.

Conventional methods of filtering disturbing values from measurement signals are based on smoothing of the measuring values. Examples are smoothing by the moving average method, smoothing by low-pass filtering, and optimum filtering (Wiener filter). All these methods have a common disadvantage in that the influence of so-called outliers, which are measured values largely differing from the actual values, though being minimized by averaging, still impair the measuring result.

The accuracy of the measurement results is improved if the input values (in particular probed point coordinates) are separated from potential outliers before further metrological processing, such that only the remaining measurement values, which are free of outliers, are further processed. For that purpose, DE 199 00 737 A1 proposes that a first regression calculation be followed by high-pass filtering to eliminate those probed point coordinates that have to be regarded as disturbed values. The downside of this procedure is that the filtering of disturbed values is based on a previously calculated shape element that is already affected by the disturbed input data. This may involve considerable deviations in the position and orientation of the shape element, such that the subsequent filtering process may not filter out the actual disturbed values.

In principle, regression analysis is a method of fitting a geometric primitive (shape element) to a non-ordered set of input coordinate points $P_i(x_i, y_i)$ with the aim to minimize the sum of deviations of the points $P_i(x_i, y_i)$ relative to the shape element. Known measures of deviation are the absolute value of the distance, the square of the distance, and the amount of the distance between the maximum positive and maximum negative deviations relative to the shape element. Regression analysis does not include a determination as to whether the resulting shape element is the best possible representation of the aggregate of measurement points. However, if the set of input coordinate points $P_i(x_i, y_i)$ is representative of the shape element, the shape element is more precisely characterized than by the recognition methods described below.

Apart from the analysis of coordinate measurements, the elimination of disturbing structures also plays an essential part in problems of technical recognition. In order to increase the certainty of information in the detection of obstacles by a low-flying aircraft, DE 100 55 572 C1 proposes that overhead power lines be detected in distance measuring images by means of a detection method for horizontal straight lines, known to persons skilled in the art as Hough transformation. With this procedure, however, the derivation of detailed information about the position and orientation of the shape element can only be achieved with considerable computational effort. For tasks in precision measurement, methods of regression analysis of shape elements may be used with much greater efficiency.

DE 695 23 965 T2 describes a recognition device and a corresponding method for a two-dimensional code, wherein a regression analysis is carried out with all acquired image points. Further, a Hough transformation is performed for the recognition of straight lines, wherein the number of points used in the method is reduced before the transformation is made, in order to reduce the computational effort.

In general, the recognition of shape elements means a determination as to whether a desired shape element occurs within the given flat or three-dimensional measuring volume. The identification process includes a determination of the best possible agreement between the shape element and the arrangement of inputted coordinate points $P_i(x_i, y_i)$ (aggregate of measurement points). Together with the identification, the identified shape element is characterized by characteristic parameters (position, size, orientation). In recognition methods, only a coarse determination of position, size and orientation is possible due to the high computational effort.

The Hough transformation is a tool for recognizing geometric primitives, such as straight lines and circles, in a non-ordered set of input coordinate points $P_i(x_i, y_i)$ Unlike in fitting geometric primitives by methods using regression analysis, where measures characterizing deviations are used, the Hough transformation uses a frequency measure. The criterion for recognizing the geometric primitive is: the maximum number of input coordinates lie on the geometric primitive. Therefore, the Hough transformation is very robust against disturbances having a low probability of occurrence, such as outliers, contour breaks, or hidden features of the structure to be identified.

The above mentioned Hough transformation is a recognition method and was developed for detecting straight-line features within a Cartesian coordinate space. A fundamental illustration can be found, e.g., in U.S. Pat. No. 3,069,654. The potential applications of the Hough transformation are also described in "Praxis der digitalen Bildverarbeitung und Mustererkennung" by P. Haberäcker, Munich, Hanser, 1995.

The invention provides a method in which the position and orientation of the wanted type of shape element in a greatly scattered aggregate of input coordinate points can be determined, while retaining the advantages of the low measurement uncertainty of shape element regression analysis.

The method according to the invention is based on an innovative combination of recognition methods that are robust against measurement errors and the more accurate shape element regression analysis for the respective same type of desired shape element. The decisive point is that all relevant measurement results are supplied to a recognition method for a shape element which is, as a general rule, predefined. After recognition of the shape element, the measurement values outside a given range can be excluded as outliers. The subsequent regression analysis applied to the remaining measurement values results in a much more accurate determination of the shape element, since the outliers no longer deteriorate the result of the determination of the shape element in this process step.

Even though the following description of the method largely refers to the example of optically acquired measurement values, it should be noted that the method is generally applicable to measurement values acquired by any suitable method. The optical acquisition of measurement data represents a preferred example since it may suffer from particularly serious deviations from the actual structure due to soiling and illumination effects.

Preferably, the Hough transformation is used as a recognition method performed in the beginning. However, also other recognition methods may be used, which need not be illustrated herein in more detail as they are known to those skilled in the art.

A considerable improvement in the suppression of disturbances, as compared to the prior art, is achieved in that the type of the desired shape element is already taken into account when the input coordinate points are examined with respect to the presence of outliers. This is in contrast to the conventional method where the type of the desired shape element is taken into account only in the subsequent processing (in the next processing step).

One advantage of the method according to the invention is that outlier identification relates to the shape of the desired shape element. Thus, the determination of the position and orientation of a particular shape element is possible even from a highly scattered aggregate of points. This is in particular necessary in measuring methods using image analysis, if the structures to be recognized are disturbed by unknown systematic structures in the foreground or the background of the image. Examples are the recognition of geodetic features in images of a landscape, or the determination of geometric features of edges of objects in the image that are contaminated by dust.

The use of robust recognition methods for determining the position and orientation of the shape element permits reliable filtering of disturbing structures and does also provide a starting solution for the subsequent regression analysis of shape elements, which is not affected by disturbing signals.

An advantageous embodiment is characterized by performing a preliminary regression analysis of the shape element in advance of the Hough transformation used as a recognition method. The generation of a quality parameter (E) from the result of the shape element regression analysis, and the determination whether this parameter (E) lies within a given tolerance range (T) allows the user to decide whether the computational effort of the Hough transformation is required at all.

FIG. 1 illustrates a surveying apparatus according to an embodiment of the invention. The surveying apparatus is a video tacheometer 101 comprising a tripod mounting structure 103 having a mounting base 105 and three legs 107 for supporting the mounting base 105 on a ground. A U-shaped alidade 109 is mounted on the mounting base 105 to be rotatable about a vertical axis 111 and supports a camera 113 to be rotatable about a horizontal axis 115 relative to the U-shaped alidade 109. The camera 113 comprises an objective lens 119 and a semiconductor image sensor (not shown in FIG. 1) contained in a housing 117 of the camera 113. Image data detected by the camera are supplied to a controller 121 of the video tacheometer 101. The controller 121 has a tablet-PC having a display 123 and input devices such as buttons 125. The display 123 is a touch screen display such that the display also may function as an input device of a controller 121.

The image data supplied from the camera 113 are displayed on the touch screen display 123 to visualize an image of objects disposed in the field of view of the camera 113.

In the example illustrated in FIG. 1, the objects within a field of view of the camera 113 comprise a building 127 having a wall 129, a window 131 and a roof 133. A further object within the field of view of the camera 113 is a tree hiding a portion of the building 127. For the purpose of the illustration of the present embodiment, it is assumed that it is a task of a user of the video tacheometer 101 to measure the position and orientation of an upper edge 137 of the roof 133. For this purpose, an image processing software running on a processing unit of the controller 121 has to identify the edge 137 using the method illustrated in more detail herein below.

As a first step, the user selects a region of interest in the image containing the edge 137 to be analyzed. The region of interest is selected by the user using a pen cooperating with the touch screen display. The region of interest is indicated on the display 123 by a rectangle 139 shown in broken lines.

The user then selects a type of the geometric shape element which is suitable for approximating the desired feature of the object, which is the edge 137 of the roof 133. In this present example, the suitable type of the shape element will be the straight-line, and the user may perform the selection using the buttons 125 or touch screen display 123.

The image processing is then started by the user, for example by operating one of the buttons 125.

One problem encountered in the image analysis is the fact that a portion of the edge 137 is hidden by the tree 135, and conventional methods, such as regression analysis and fitting might not be able to determine parameters of the straight-line such that the straight-line substantially coincides with the edge 137 of the roof 133 in the image.

The image processing starts by filtering the image data representing the region 139 of interest using a suitable method, for generating measuring data representing contours of the objects within the region 139 of interest, such as a contour of the tree 135 and a contour of the roof 133. The measuring data are then further processed as illustrated herein below.

Figure 2:
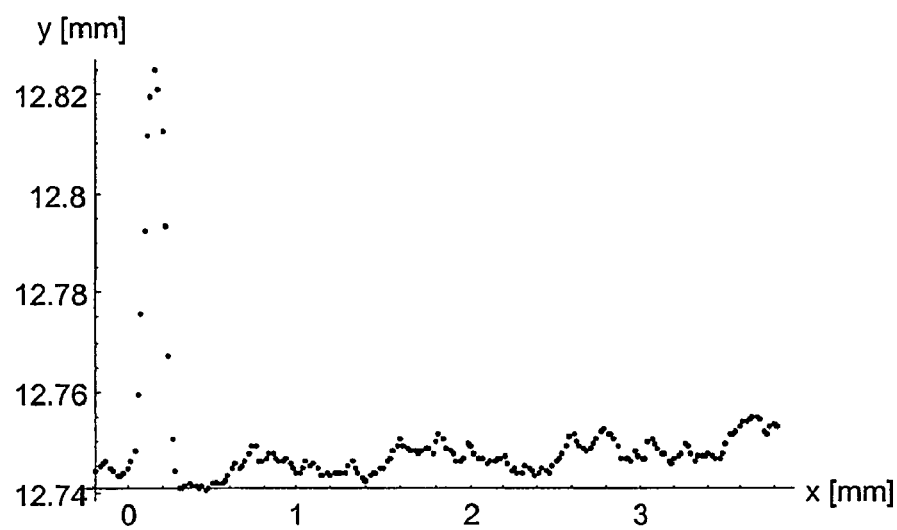
FIG. 2 is a graph showing a set of data values obtained from a measuring device and including disturbances.

FIG. 2 is a graph showing an example of a set of measuring data generated from a selected region 139 of interest as illustrated above. The measuring data are represented as data values of probed points $P_i(x, y)$ acquired during the measurement of an object, such as the roof 133 in FIG. 1, along a straight edge. As illustrated above, optical precision measurements are frequently impaired by the disturbances, such as the test object being hidden by an obstacle during the measurement. In other applications, where a measurement is performed during a manufacturing process, soiling of the object may present a similar problem.

Even the slightest deposits remaining from the manufacturing process may lead to the test object being wrongly rejected. FIG. 2 clearly illustrates the influence of disturbances by outliers among the probed points within a range of x=0 to 0.5 mm.

To solve this problem, the invention uses a combination of recognition and regression analysis for shape elements.

Figure 3:
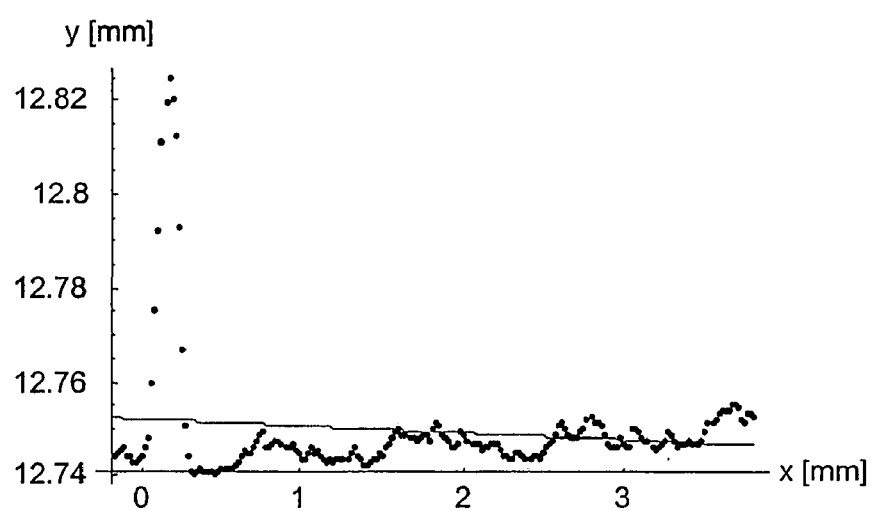
FIG. 3 is a graph showing the set of data values of FIG. 2 and including a line determined by a regression analysis fit.

The graph shown in FIG. 3 includes a straight fitting line resulting from a Gaussian regression analysis for the desired shape element, if the points (measured data) are supplied to the regression analysis without prior filtering. FIG. 3 shows that the outliers among the measured data have a considerable influence on the course of the fitting line, which deviates from the evidently positive slope of the aggregate of points in x direction and exhibits a negative slope instead.

To determine whether the calculated shape element is valid, a Parameter E is derived and compared with a predefinable tolerance range T. The parameter E characterizes, for example, a range about the obtained shape element by way of the Euclidean distance (see also below with reference to FIG. 6). The parameter E may be determined, e.g., by the shape deviation f or the standard deviation s of the calculated shape element. It is apparent that other rules for determining E by means of regression analysis can be derived. Assigning a suitable rule for determining E to the respective measurement job can be effected according to the following conditions:

If all measured points are to lie within the tolerance range T, then E=f is fulfilled.

If (assuming a Gaussian distribution of the deviations of the inputted points from the calculated shape element) at least 99.73% of the inputted points are to lie within the tolerance range T, then E=3 s is fulfilled.

If (assuming a Gaussian distribution of the deviations of the inputted points from the calculated shape element) at least 0.95% of the inputted points are to lie within the tolerance range T, then E=2 s is fulfilled.

If the parameter E exceeds a permissible predefinable tolerance range T, the shape element determined by regression analysis cannot be regarded as valid. It is here that the invention comes in with a filtering of, the measured coordinate points.

Figure 5:
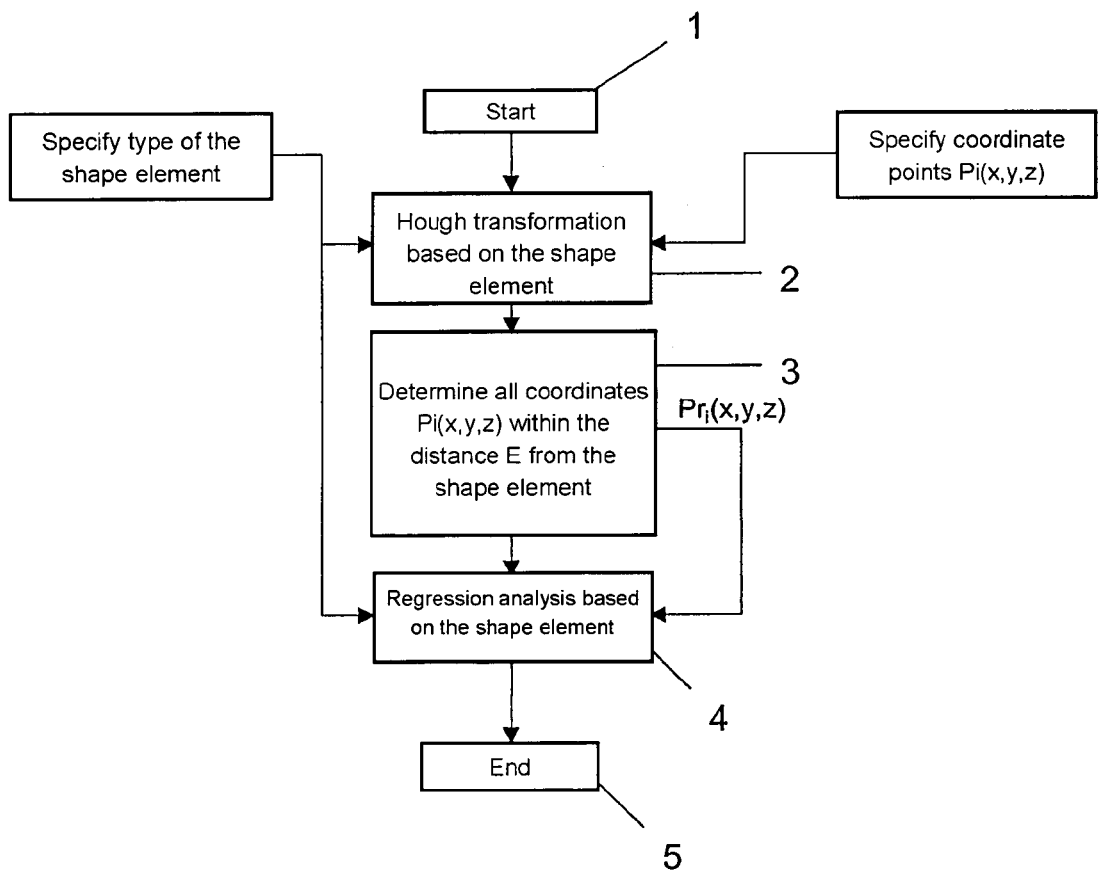
FIG. 5 is a flowchart illustrating a method of analyzing measuring data according to a first embodiment of the invention.

FIG. 5 is a flow chart showing process steps of the method for analyzing the measuring data. The method starts with step 1. In order to improve the result of the shape element determination, a shape element recognition procedure is performed first. For this purpose, the best position of the shape element in the sense of its "most frequent occurrence" is determined in step 2, the recognition method being, e.g., a Hough transformation. The Hough transformation involves all coordinate points (probed points) $P_i$ as far as they lie within a predefinable validity range that is independent of the position of the shape element. It is, of course, feasible to exclude particular measured data from processing if they are obviously outside the validity range. The probed points $P_i$ are defined by their coordinates (x, y, z) and may be, depending on the measurement job, two-dimensional or three-dimensional values.

Figure 7:
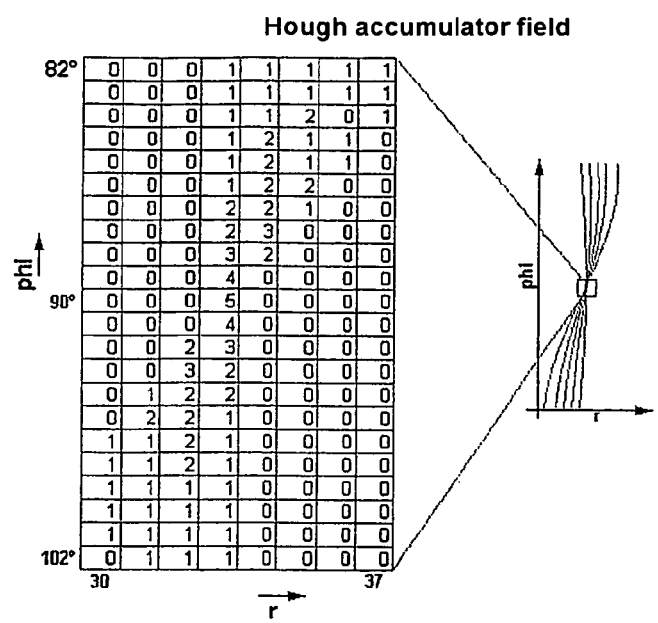
FIG. 7 is a representation of a Hough parameter space exemplified by the shape element "straight-line"

In addition, the type of the desired shape element can, in most cases, be determined by the specific measurement job. A variety of recognition methods are known to those skilled in the art, so that there is no need to illustrate the operation of these methods in detail here. For illustration purposes, FIG. 7 shows a representation in the Hough parameter space, exemplified by the shape element "straight line".

Figure 6:
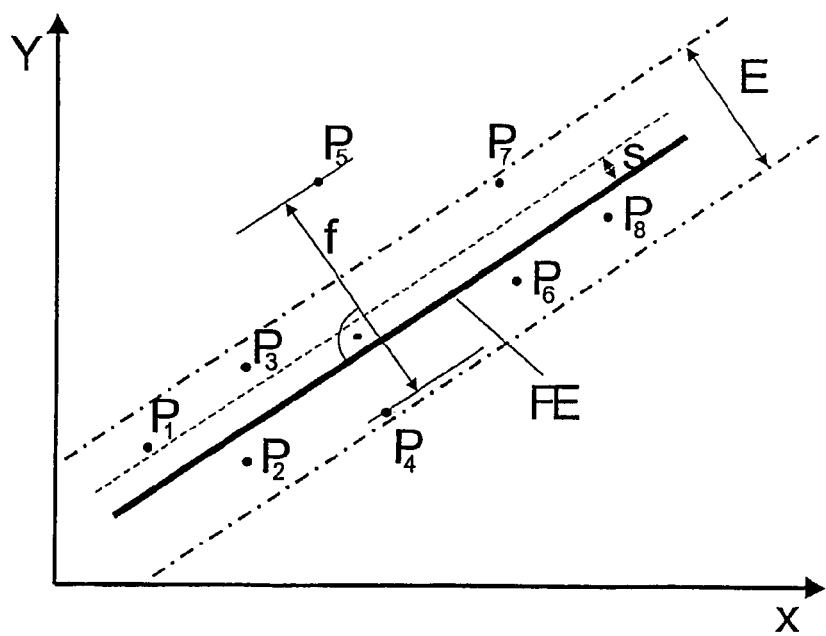
FIG. 6 is an illustration representing details of the method illustrated in FIG. 5.

Analogously to the procedure described above for the determination of shape elements by regression analysis, a range E about the shape element FE determined by the Hough transformation is derived, wherein the relevant probed points $Pr_i$ have to lie within that range. FIG. 6 depicts such selection as a diagram in which the probed points $P_1$ through $P_8$ are shown with the shape element "straight line" serving as an example. Points outside the range E, such as, e.g., $P_5$, are eliminated from the aggregate of points.

With reference again to FIG. 5, the selection of the relevant points to remain in the aggregate is made in step 3. In the subsequent step 4, the remaining aggregate of points $Pr_i$ is subjected to a regression analysis. Thus, the regression analysis is performed with the outliers being excluded, wherein the outliers are located outside the range E after the recognition step. The regression analysis therefore achieves more precise results as compared to a regression analysis performed on data including the outliers. The method terminates with step 5.

Figure 4:
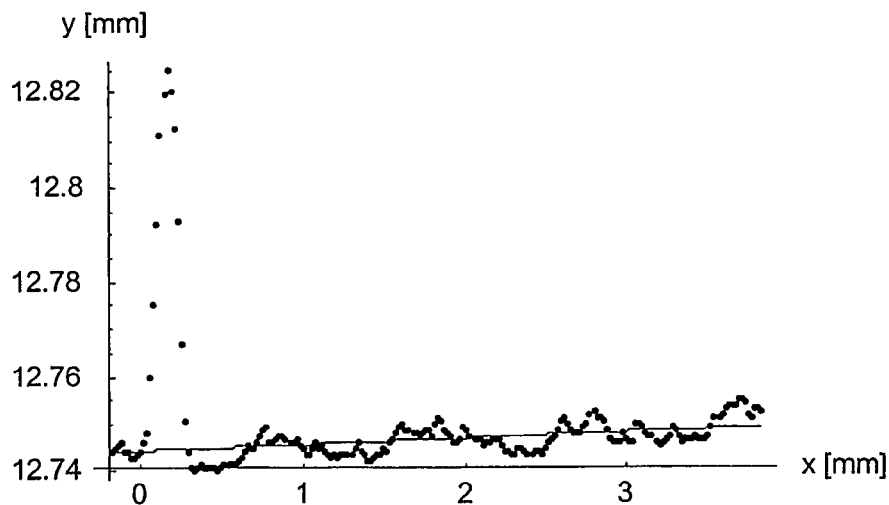
FIG. 4 is a graph showing the measuring data of FIG. 1 and including a straight-line determined by a regression analysis fit based on the data values not including outliers.

FIG. 4 is a diagram showing the aggregate of points shown in FIG. 2, and the result calculated by the illustrated method, which is the line determined by regression analysis. The method may also include further iterative steps.

Figure 8:
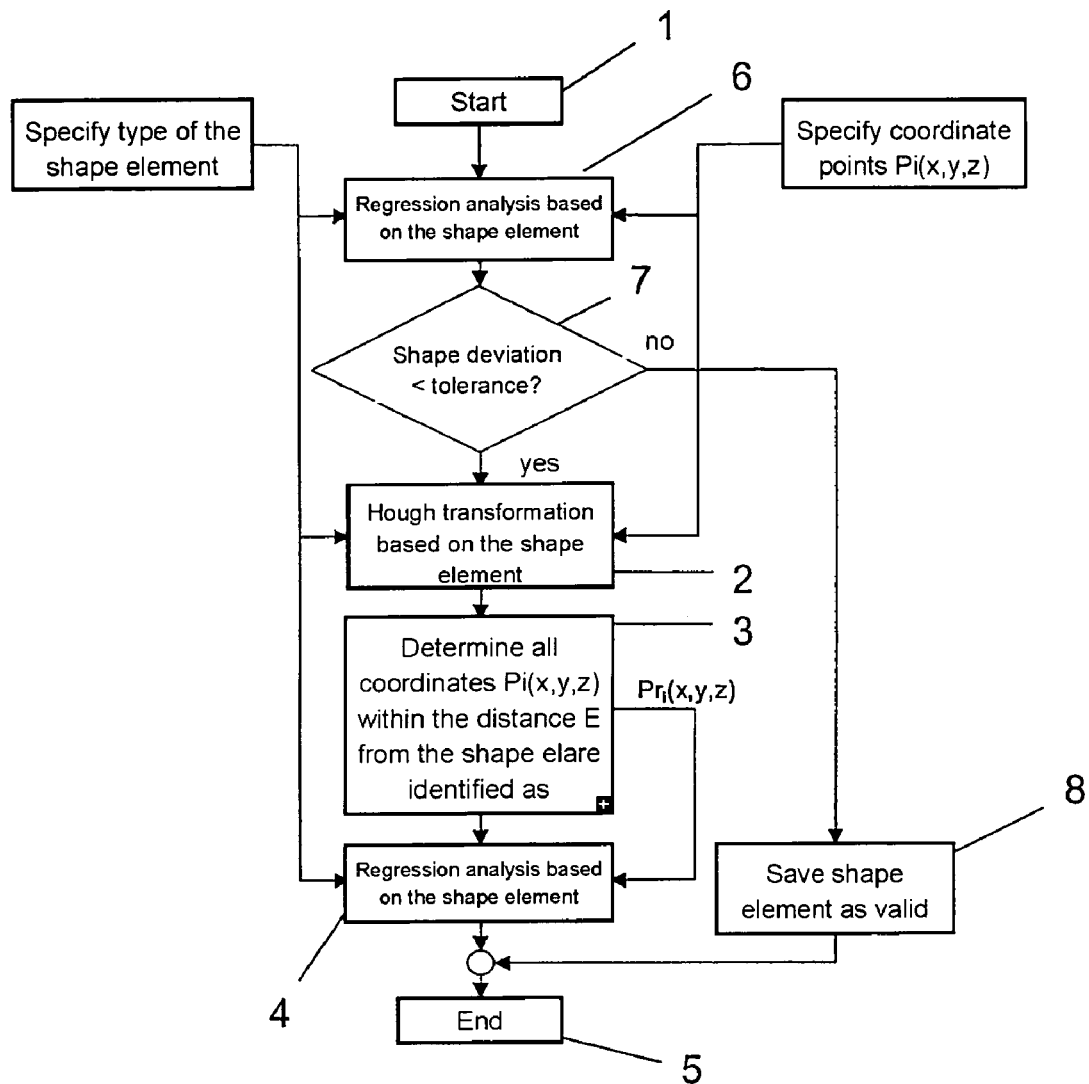
FIG. 8 is a flowchart illustrating a method of analyzing measuring data according to a second embodiment of the invention.

FIG. 8 is a flow chart of a further embodiment of the method. As compared to the embodiment of the method illustrated with reference to FIG. 5, a main difference is that the recognition (Hough transformation) performed in step 2 is preceded by an additional shape element regression analysis. This preceding shape element adjustment calculation is made in step 6 and takes into account the inputted coordinate points $P_i$. The determination of the desired shape element in the first process step by means of shape element regression analysis increases the speed of the method, provided that the input points are free from disturbances. The subsequent time-consuming Hough transformation is only performed if the determination made in step 7 reveals that the quality parameter E of the regression analysis is outside a predefinable tolerance range T. If E is within the permissible, predefinable tolerance range T, the shape element is declared valid in step 8 and issued as the measurement result.

In applications in which the desired shape element may not be located within the input data or in which several shape elements of the same type exist, the Hough transformation is to be performed as the first process step, as it is shown in FIG. 5. One advantage of this variant is, as compared to the variant according to FIG. 8, that the recognition process can determine not only the position but also the type of the most frequently occurring shape element. Moreover, the preliminary recognition method can detect, in a single step, plural shape elements of a same type which occur with a predefinable minimum frequency. This makes it possible to segment the input coordinates and to perform subsequent regression analyses in the various coordinate segments.

The types of shape elements that can be determined by the method according to the invention generally include standard 2D and 3D shape elements, space curves, and combined shape elements.

The software for operating the user interface of the controller 121 and performing the image analysis and the analysis of the measuring data may be loaded into the controller 121 by a suitable carrier comprising a CD ROM inserted in a CD ROM drive (not shown in FIG. 1) of the controller 121. Further, the software may be loaded into the computer from a suitable network, such as the Internet, through a network interface of the controller.

Figure 9:
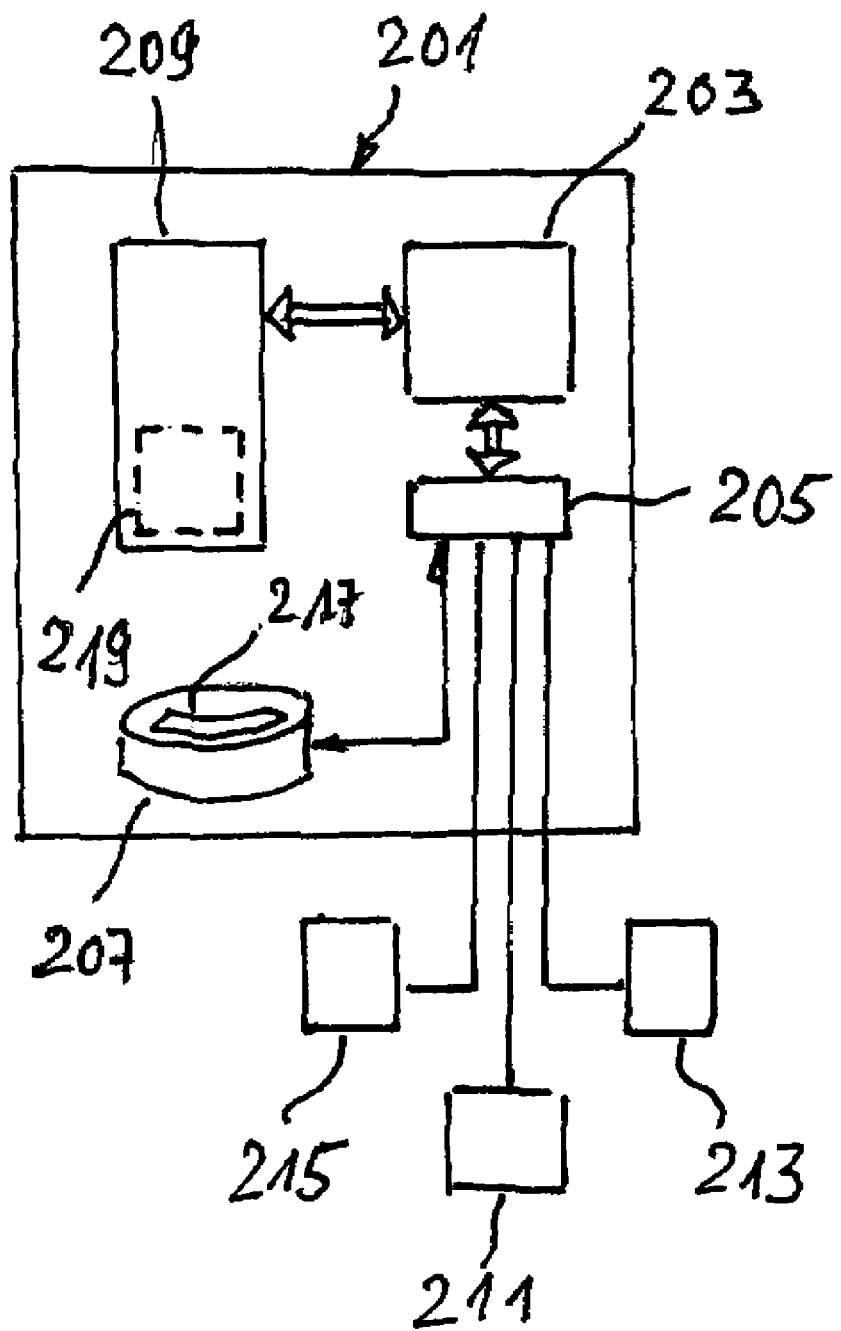
FIG. 9 is an illustration of a computer system according to an embodiment of the invention.

FIG. 9 is an illustration of a computer system according to an embodiment of the invention. The computer system 201 may be included in the controller 121 shown in FIG. 1, or the computer system 201 may be separate from a surveying apparatus. The computer system 201 is configured to perform the methods of analyzing measuring data as illustrated above, and comprises a processor 203, a peripheral interface 205 used by the processor to access peripheral devices, a mass storage device 207, such as a hard disc, for storing a bootable operating system, program instructions of application programs and other data. Reference numeral 209 in FIG. 9 represents a memory area accessed by the processor 201. The memory area may be a virtual memory area including portions located in a physical semiconductor memory and on the mass storage device 207. Peripheral devices connected to the interface 205 comprise an input device 211 such as a keyboard, a mouse, other buttons, a touch screen display and others, a display 213, and a network interface 215.

Using the input device 211, the user may instruct the computer system 201 to load measuring data generated, for example, by a surveying apparatus, into the computer system 201 through the network interface 215. The user may then instruct the computer system 201 to start a program for analyzing the measuring data, and the computer system 201 will load program instructions which are executable by the processor 203 to perform the analyzing method from the mass storage device 207 into the memory area 209. Reference numeral 217 in FIG. 9 represents a group of sectors of the mass storage device in which the program instructions for the analyzing program are stored, and reference numeral 219 illustrates a portion of the memory area 209 in which the program instructions are stored after loading the program instructions from the mass storage device 207 into the memory area 209. The program instructions 219 may be accessed by the processor 203 for executing the program to perform the analyzing methods as illustrated above. Results of the analysis may be displayed on the display device 213 and stored on the mass storage device 207.

In the above illustrated embodiments, the method of analyzing measuring data is applied to image data obtained from a surveying apparatus. It should be noted, however, that the analyzing methods and the computer system 201 may be used for analyzing measuring data obtained by any possible application. The measuring data may be obtained from a measurement of any physical or other property. According to an example, the measuring data may be image data obtained in applications other than surveying applications. For instance, the image data may represent an image of articles of manufacture. The analysis of the measuring data may be used to determine a quality of the articles of manufacture, where the image data are disturbed by electronic noise, soiling, artifacts or other influences.

To summarize, embodiments of the invention relate to a method for minimizing the influence of disturbing signals during calculation of shape elements from coordinate points. An aim of the embodiments of the invention is to exclude the coordinates which are not to be locally assigned to the desired shaped element from the calculation of the shaped element. Said aim is achieved by combining compensation methods for calculating the desired type of shaped element with recognition methods for the same type of shaped element and using the recognition methods for filtering the coordinate points that are relevant for calculating the shaped element out of all input coordinate points.

The present invention has been described by way of exemplary embodiments to which it is not limited. Variations and modifications will occur to those skilled in the art without departing from the scope of the present invention as recited in the appended claims and equivalents thereof.

The present application in particular discloses the following items (1) to (9):

(1) A method for minimizing the influence of disturbing signals in calculating shape elements from input coordinate points, comprising the following steps:

performing a recognition method involving all input coordinate points for calculating a recognized shape element;

filtering out relevant coordinate points from the input coordinate points, which are located within a predefinable parameter about the shape element determined in the recognition method; and performing a regression analysis for the same type of shape element, involving the filtered out relevant coordinate points, for computing a final shape element.

(2) The method according to item (1), characterized in that the recognition method is preceded by a regression analysis of the desired shape element involving all input coordinates, such that performing the steps of performing the recognition method involving all input coordinates, performing the filtering out of the relevant coordinate points, and of performing the regression analysis with the filtered-out coordinate points only occur if a validity parameter of the shape element determined in the preceding regression analysis is outside a predefinable tolerance range.

(3) The method according to item (1) or (2), characterized in that the recognition of the position and orientation of the desired type of shape element within the disturbed input coordinate points is performed by means of the Hough transformation and the determination of singular points in the Hough parameter space.

(4) The method according to one of items (1) to (3), characterized in that, a multidimensional range about the determined shape element is determined for the purpose of deciding whether the shape element calculated in the preceding adjustment calculation is valid and/or for the purpose of filtering out the relevant coordinate points by means of the recognition procedure, wherein the region is defined by the Euclidean distance from the shape element.

(5) The method according to item (4), characterized in that the Euclidean distance is determined on the basis of a specified tolerance range of the shape deviation of the shape element.

(6) The method according to item (4), characterized in that the Euclidean distance is determined on the basis of the statistical distribution of the residual deviation from the desired type of shape element.

(7) The method according to item (6), characterized in that the standard deviation is determined from the statistical distribution of the residual deviation from the desired type of shape element, and that the standard deviation is taken into account in the determination of the distance.

(8) The method according to one of items (1) to (7), characterized in that the recognition procedure identifies the type of shape element.

(9) The method according to item (8), characterized in that the recognition procedure determines plural shape elements of the same type in one process step, and that the subsequent filtering out of the relevant coordinate points and the shape element regression analysis are applied to all shape elements found in the recognition procedure.

The invention claimed is:

1. A method of analyzing measuring data, the method comprising:
    inputting measuring data from a measuring device, the measuring data comprising a set of data values representing features of an object;
    performing a recognition method on at least a subset of the data values for determining first parameters of a geometric shape element representing at least a portion of a feature of the object;
    eliminating outliers from the set of data values, the outliers having a distance from the shape element having the determined first parameters greater than a first threshold;
    performing a first regression analysis on a set of remaining data values not including the outliers, for determining second parameters of the geometric shape element such that the shape element having the second parameters is a better representation of the at least one portion of the feature of the object than the shape element having the first parameters; and
    outputting the shape element having the second parameters for at least one action selected from the group consisting of: storing the shape element having the second parameters for use as the better representation of the at least one portion of the feature of the object, displaying the shape element having the second parameters for use as the better representation of the at least one portion of the feature of the object, or providing information about the at least one portion of the feature of the object.

2. The method according to claim 1, wherein the recognition method comprises determining the first parameters of the geometric shape element such that a number of data values coinciding with the geometric shape element having the first parameters has a maximum value.

3. The method according to claim 1, wherein the recognition method comprises performing a Hough transformation based on the subset of data values.

4. The method according to claim 1, wherein the distance of the data values from the shape element having the first parameters is an Euclidean distance of the data values from the shape element having the first parameters.

5. The method according to claim 1, wherein the first threshold is a predetermined threshold.

6. The method according to claim 1, wherein the first threshold is determined based on an analysis of a distribution of values of the distances of the data values from the shape element having the determined first parameters.

7. The method according to claim 1, wherein the shape element comprises a straight line, a circle, an ellipse and a cylinder.

8. The method according to claim 1, wherein the shape element comprises a straight line and wherein the first parameters comprise a slope and an offset of the straight line.

9. A surveying apparatus comprising:
    a camera;
    a controller for receiving image data from the camera, wherein the controller is configured to generate measuring data to be analyzed from the image data and to perform the method of analyzing the measuring data according to claim 1.

10. The surveying apparatus according to claim 9, further comprising an input device for receiving a user selection of a type of the geometric shape element.

11. The surveying apparatus according to claim 10, wherein the shape element comprises a straight line, a circle, an ellipse and a cylinder.

12. The surveying apparatus according to claim 9, further comprising a display for displaying an image represented by the image data.

13. The surveying apparatus according to claim 12, further comprising an input device for selecting a portion of the displayed image, wherein the controller is configured to generate the measuring data to be analyzed from the image data representing the selected portion of the displayed image.

14. The surveying apparatus according to claim 9, further comprising an output device for receiving the determined parameters of the shape element.

15. A computer-storage medium containing information representing a computer program adapted to cause a processing unit to execute the method of claim 1.

16. A computer system, comprising:
    a processor; and
    a program storage device readable by the computer system, tangibly embodying a program of instructions executable by the processor to perform the method according to claim 1.

17. A method of analyzing measuring data, the method comprising:
    inputting measuring data from a measuring device, the measuring data comprising a set of data values representing a feature of an object;
    performing a second regression analysis on at least a subset of the data values, for determining third parameters of a geometric shape element representing at least a portion of a feature of the object;
    determining a value representing a quality of the representation of the at least one portion of the feature of the object by the geometric shape element having the third parameters;
    performing a recognition method on the subset of the data values for determining first parameters of the geometric shape element representing the at least one portion of the feature of the object, wherein the recognition method is performed only if the value representing the quality of the representation exceeds a second threshold;
    eliminating outliers from the set of data values, the outliers having a distance from the shape element having the determined first parameters greater than a first threshold;
    performing a first regression analysis on a set of remaining data values not including the outliers, for determining second parameters of the geometric shape element such that the shape element having the second parameters is a better representation of the at least one portion of the feature of the object than the shape element having the first parameters; and
    outputting the shape element having the second parameters for at least one action selected from the group consisting of: storing the shape element having the second parameters for use as the better representation of the at least one portion of the feature of the object; displaying the shape element having the second parameters for use as the better representation of the at least one portion of the feature of the object, or providing information about the at least one portion of the feature of the object.

18. The method according to claim 17, wherein the recognition method comprises determining the first parameters of the geometric shape element such that a number of data values coinciding with the geometric shape element having the first parameters has a maximum value.

19. The method according to claim 17, wherein the recognition method comprises performing a Hough transformation based on the subset of data values.

20. The method according to claim 17, wherein the value representing the quality of the representation of the at least one portion of the feature of the object by the geometric shape element having the third parameters is determined based on distances of the data values from the shape element having the third parameters.

21. The method according to claim 20, wherein distances of the data values from the shape element having the third parameters are Euclidean distances of the data values from the shape element having the third parameters.

22. The method according to claim 20, wherein the second threshold is a predetermined threshold.

23. The method according to claim 20, wherein the second threshold is determined based on an analysis of a distribution of values of the distances of the data values from the shape element having the third parameters.

24. A surveying apparatus comprising:
a camera;
a controller for receiving image data from the camera, wherein the controller is configured to generate measuring data to be analyzed from the image data and to perform the method of analyzing the measuring data according to claim 17.

25. A computer-storage medium containing information representing a computer program adapted to cause a processing unit to execute the method of claim 17.

26. A computer system, comprising:
a processor; and
a program storage device readable by the computer system, tangibly embodying a program of instructions executable by the processor to perform the method according to claim 17.

* * * * *

UNITED STATES PATENT AND TRADEMARK OFFICE
CERTIFICATE OF CORRECTION

PATENT NO. : 7,246,034 B2　　　　　　　　　　　　　　　　　　　　　　Page 1 of 1
APPLICATION NO. : 11/078637
DATED : July 17, 2007
INVENTOR(S) : Christian Usbeck et al.

It is certified that error appears in the above-identified patent and that said Letters Patent is hereby corrected as shown below:

Column 6, line 48, "noh-ordered set" should read --non-ordered set--;

Column 6, line 48, "Pi (xi, yi) Unlike" should read --Pi (xi, yi). Unlike--.

Column 9, line 36, "at least 0.95%" should read --at least 95%--;

Column 9, line 41, "of, the" should read --of the--.

Signed and Sealed this

Eighth Day of July, 2008

JON W. DUDAS
*Director of the United States Patent and Trademark Office*